Patented Apr. 20, 1954

2,676,089

UNITED STATES PATENT OFFICE 2,676,089

PROCESS FOR THE PREPARATION OF CHLORINE DIOXIDE

Ernst Wagner, Konstanz, Germany, assignor to Deutsche Gold- und Silber-Scheideanstalt vormals Roessler, Frankfurt am Main, Germany, a corporation of Germany No Drawing. Application June 6, 1949, Serial No. 97,478

Claims priority, application France June 10, 1948

3 Claims. (Cl. 23—152)

The present invention relates to an improved process for the preparation of chlorine dioxide and more particularly to an improved process for the preparation of chlorine dioxide from an acidified chlorate solution in the presence of a reducing agent and an inert gas such as air.

It is an object of the invention to provide a process for the production of improved yields of chlorine dioxide from chlorates.

It is a further object of the invention to provide a process for the production of chlorine dioxide from chlorates wherein the spontaneous decomposition of the chlorine dioxide as it is being produced is kept at a minimum.

Many different processes have already been developed for the production of chlorine dioxide. For example, it has been proposed to treat chlorinated lime with chlorine to effect oxidation thereof and then to treat such product with HCl to free a gas mixture composed of chlorine and chlorine dioxide from which the chlorine is removed through selective absorption. Most of the proposed processes, however, employ chloric acid or its alkali metal or alkaline earth metal salts. For example, chlorine dioxide may be generated from chlorate solutions by heating such solutions with large quantities of concentrated sulfuric acid or with an excess of strong hydrochloric acid. In the latter instance the hydrochloric acid also simultaneously acts as a reducing agent to produce chlorine dioxide and chlorine and the reaction is represented by the following equation:

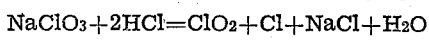

Also when concentrated sulfuric acid is employed other gases such as chlorine and oxygen are obtained in addition to the desired chlorine dioxide. The undesired production of chlorine can be ascribed either to the decomposition of the chloric acid or chlorine dioxide or upon too complete a reduction.

In order to diminish the production of such chlorine, the use of other reducing agents, preferably organic compounds such as oxalic acid or sugar has been proposed. When, for example, oxalic acid is employed as the reducing agent the reaction is represented by the following equation:

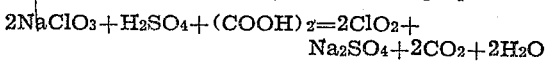

Such reaction, however, gives rise to difficulties when carried out upon a large scale because side reactions are unavoidable. Above all the chlorine dioxide itself is very unstable and depending more or less upon the temperature, concentration and quantity of H₂SO₄, in addition to the production of chloric acid and chlorine dioxide the latter decomposes spontaneously to chlorine and oxygen. Such decomposition causes evolution of heat and the evolution of such heat leads to the danger of increasingly greater decomposition of the chlorine dioxide.

The yield of chlorine dioxide obtained is considerably below the theoretical and in the best cases lies between 50% and 60% of the theoretical. The chlorine which is produced by the undesired side reaction is not the only cause for such low yields. A further cause is that it is impossible to cause complete conversion of the NaClO₃ according to such equations. The conversion of the NaClO₃ may be increased by employing excesses of H₂SO₄ and oxalic acid. The use of such excesses are, however, not feasible in large scale operations as they lead to a stormy course of reaction which is evidently caused by far reaching decomposition of the ClO₂ produced, either into chlorine and oxygen, or into chlorine and carbon dioxide through reaction with the reducing agent. In any event it is not possible to obtain better yields than those specified in continuous processes by the use of most carefully controlled excesses of H₂SO₄ and oxalic acid.

It has already been proposed to reduce the spontaneous decomposition of the chlorine dioxide by dilution with an inert gas such as air or carbon dioxide. Such inert gases are usually introduced at the bottom of the reaction vessel or column and are permitted to bubble up through the reaction mixture in order to drive out as much of the chlorine dioxide as possible, and the chlorine dioxide laden inert gas is drawn off at the top of the column. Such procedure operates upon a counter current principle.

In accordance with the invention it has been discovered that if the inert gas or at least a substantial portion of the necessary inert gas is supplied to the top of such a reaction column in which the starting materials are also supplied at the top and if such inert gas is caused to flow concurrently with the reactants in their course through the apparatus, the following advantages are obtained. First of all the diluting gas is immediately available at the point at which the first quantities of chlorine dioxide are produced by reaction between the chlorate and acid and consequently the point when the greatest danger of decomposition exists because of the relatively high concentration of the reactants so that the inert gas can immediately exert its moderating effect. Also, through the concurrent flow of the inert gas the partial pressure of the chlorine dioxide therein is maintained lowest in the zones where the strongest reactions occur. The concentration of the chlorine dioxide in the inert gas increases as the reducing agent is used up and consequently the further reduction of the chlorine dioxide is reduced.

It was furthermore discovered that the continuous production of chlorine dioxide from acidified chlorate solutions in the presence of a suitable reducing agent could be improved by the addition of foaming agents to such solutions which improve the exsorption. For this purpose all substances are suitable which under the conditions of the reaction produce foam, for example, the sulfonation products of fatty acids, fatty acid esters, fatty alcohols naphthalene derivatives and the like, which have been employed as wetting agents in the textile industry. Also protein containing waste products and the like, such as, whey may also be employed with good results. It is already known that the exsorption of gases from these solutions can be speeded by the introduction of an inert gas into such solutions. The addition of foaming agents, however, renders it possible to subdivide the gas bubbles which are formed to a great extent and thereby increase the interphase surface area greatly whereby the exsorption is rendered more rapid. Not only is the gas generation substantially speeded in the presence of the foaming agents but the reaction solution encloses the inert gas bubbles in such thin lamellae that the chlorine dioxide which is produced is withdrawn from the solution and diluted in the inert gas relatively rapidly so that the further action of the reducing agent upon the chlorine dioxide is reduced to a substantial degree. Yields of 75% and more of chlorine dioxide based upon the chlorate used as starting material have been achieved by this means.

The extensive exhaustion of the chlorate required to obtain such yields is achieved because of the presence of the foaming agent which speeds up the exsorption of the $ClO_2$. Because of the more rapid exsorption of the $ClO_2$ in view of the presence of the foaming agent it is possible to maintain smaller concentrations of $ClO_2$ in the reaction solution even though only very short time is available for the exsorption in continuous processes with very high throughput. The very rapid removal of the $ClO_2$ from the reaction solution also prevents a further deleterious reaction between the $ClO_2$ which is produced and the reducing agent in the reaction solution. This not only renders it possible to produce a purer $ClO_2$ but it also prevents unnecessary consumption of the reducing agent which is sometimes relatively expensive.

The use of foaming agents is, however, only rendered possible by conducting the inert gas concurrently with the reaction solution through the reaction vessel. If gas bubbles and foam were permitted to rise through the apparatus countercurrent to the flow of the reaction mixtures a great many technical difficulties would be encountered. For example, such a procedure would lead to the presence of varying quantities of foam and thus would render it impossible to supply the reactants in constant quantities. Also with large quantities of foam, these sometimes become lodged in portions of the apparatus which must be kept free for gases or liquids and cause disturbances which require the interruption of the addition of the reactants.

It was furthermore discovered that especially favorable results are obtained if the foaming agent employed simultaneously also acts as the reducing agent for the process. In this manner difficulties in regulating the quantities added are avoided and furthermore the foaming action is diminished as the reaction proceeds as the consumption of the reducing agent during the reaction also consumes the foaming agent. This feature is of particular importance in a continuous process for in this way the difficulties which are produced by the heavy foam formation which sometimes occurs upon heating the liquid and conveying the liquid through pumps and the like especially with over-dosing or enrichment of the foaming agent in the apparatus may be substantially avoided. Continuous processes for production of chlorine dioxide are especially desirable in view of the strong heat formation of the whole reaction and also of the strongly exothermic decomposition of chlorine dioxide for with a continuous process accumulation of large quantities of reactive reaction mixture is avoided and a failure of the reaction is out of the question. Furthermore, in a continuous process the gases withdrawn can very easily be maintained substantially constant, and such constancy is of particular importance in the subsequent treatment thereof, for example, in the reduction into chlorite or in absorption.

Vinasse and extraction tar from wood oils are examples of foaming agents which also possess reducing properties. It has also unexpectedly been found that concentrated sulfite liquor or cellulose pitch, a product obtained by the evaporation of waste sulfite liquor is especially adapted for the process in accordance with the invention for it not only possesses favorable reducing properties but it is also especially well adapted for regulated foam formation. This is especially unexpected as it is well known that lignin is quickly attacked by chlorine dioxide or chlorites and that the quantitative separation of lignin from cellulose, which itself has been suggested as a reducing agent for production of chlorine dioxide, may be effected with chlorites. It was, therefore, to be expected the lignosulfonic acid present in the cellulose pitch would attack the chlorine dioxide more strongly than the previously suggested reducing agents such as cellulose, oxalic acid and formic acid. The cellulose pitch possesses several advantages over these relatively expensive materials.

Cellulose pitch is very cheap as it is an abundant by-product of the paper and cellulose industry and has such good reducing action that only a relatively small quantity is required for the same quantity of chlorate, as it is not volatile, than when, for example, formic acid is employed as a reducing agent. In contrast with oxalic acid it possesses greater solubility. In view of the low reaction threshold of cellulose pitch of about 70° C. in comparison with, for example, the 80° C. to 85° C. of formic acid it is possible to increase the speed of reaction at the same temperature and a greater throughput is obtained with an apparatus of the same dimensions. When the reaction is carried out with sulfuric acid it is preferable to free the sulfite liquor of usual quality of lime by the addition of soda, so that even when the reaction is carried out with high sulfuric acid concentrations disturbing deposits of calcium sulfate are avoided.

In carrying out the process according to the invention a concentrated solution, for example, a solution saturated at room temperature containing a chlorate, preferably sodium chlorate, and a reducing agent is prepared and after the addition of a foaming agent it is mixed with acid while simultaneously blowing in air whereby a foam is obtained. Preferably a reducing agent is employed which simultaneously also acts as a foaming agent such as vinasse and cellulose pitch. For the liberation of chloric acid, acids may be used which are stronger than chloric acid and which do not give undesirable side reactions such as oxidizing acids as nitric acid. Preferably sulfuric acid is employed for this purpose but it should not be too concentrated for its heat of dilution upon admixture with the chlorate solution may raise the temperature to such a degree that premature reactions will take place. It is of advantage if the quantity if acid employed is sufficient to supply two and one half equivalents with reference to the quantity chlorate in order to effect a sufficient reaction speed. However, the relative quantity of acid to chlorate may vary to some degree. The foam which is obtained is introduced into the top of a column heated to about 80° C. which contains filling bodies or other means to increase the surface area. A vessel may be provided at the lower end of the column wherein the liquid flowing from the bottom of the column may be maintained for some time at the temperature of the column or slightly higher to complete the conversion. In order to drive off any dissolved chlorine dioxide an inert gas may be blown through such liquid. The gas mixture is drawn off at the bottom of the column and depending upon what subsequent treatment it is to undergo may be freed from the accompanying water vapor.

The following specific example will serve to illustrate the process in accordance with the invention.

*Example*

A solution is prepared containing 500 grams of commercial sodium chlorate, 125 grams of cellulose pitch (calculated as dry substance) and 665 ccm. of water. A second solution is prepared containing about equal volumes of sulfuric acid and water which about corresponds to about 65% sulfuric acid by weight.

These solutions are continuously converted into a foam in a foam producer by mixing 225 ccm. of the first solution and 130 ccm. of the second solution and blowing in 45 liters of air per hour. This foam is introduced into the top of a filled column of 25 mm. diameter and 600 mm. usable height which is heated to 80° C. The solution flowing from the bottom of the column is introduced into a vessel of about 2 liters content and maintained therein a short while in order to increase the conversion. In order to drive out the chlorine dioxide in such liquid 120 liters of air per hour are blown through such liquid. The effluent from such vessel which amounts to about 200 ccm. per hour still contains about 80 grams of sodium chlorate per liter indicating an 80% conversion.

The gas mixture which is drawn off at the lower end of the column may be freed of water vapor, for example, by cooling.

The absorption of such gas in alkaline $H_2O_2$ indicates that the yield of chlorine dioxide is 75%.

The process in accordance with the invention may be combined with the procedures described in copending applications entitled Process for the Preparation of Chlorine Dioxide, Serial Numbers 97,477 and 97,479, filed June 6, 1949, now Patents 2,653,079, September 22, 1953, and 2,605,168, August 29, 1952, respectively. Also the chlorine dioxide obtained in the process in accordance with the invention may be converted into solid chlorite in accordance with the procedure described in copending application entitled Process for the Preparation of Solid Chlorite, Serial Number 94,476, filed June 6, 1949, now Patent No. 2,616,783, November 4, 1952.

I claim:

1. In a process for the continuous production of chlorine dioxide from an acidified inorganic chlorate solution containing a reducing agent and in which the chlorine dioxide evolved is diluted with an inert gas, the steps which comprise forming a reaction mixture consisting of a foam comprising an inert gas, an acidified inorganic chlorate solution and a foaming agent which simultaneously is a reducing agent for such chlorate solution, introducing said reaction mixture into the top of an extended elongated reaction space and conducting such reaction mixture through the extended elongated reaction space, whereby the inert gas is conducted through said reaction space concurrently with the liquid reaction components of the previously formed foam.

2. In a process for the continuous production of chlorine dioxide from an acidified inorganic chlorate solution containing a reducing agent and in which the chlorine dioxide evolved is diluted with an inert gas, the steps which comprise forming a reaction mixture consisting of a foam comprising an inert gas, an inorganic acidified chlorate solution and concentrated sulfite liquor as the reducing agent for such solution which simultaneously acts as a foaming agent, introducing said reaction mixture into the top of an extended elongated reaction space and conducting such reaction mixture through the extended elongated reaction space, whereby the inert gas is conducted through said reaction space concurrently with the liquid reaction components of the previously formed foam.

3. In a process for the continuous production of chlorine dioxide from an acidified inorganic chlorate solution containing a reducing agent and in which the chlorine dioxide evolved is diluted with an inert gas, the steps which comprise forming a reaction mixture consisting of a foam comprising an inert gas and the acidified chlorate solution containing the reducing agent and a foaming agent, introducing said reaction mixture into the top of an extended elongated reaction space and conducting such reaction mixture through the extended elongated reaction space whereby the inert gas is conducted through said reaction space concurrently with the liquid reaction components of the previously formed foam.

References Cited in the file of this patent

UNITED STATES PATENTS

| Number | Name | Date |
|---|---|---|
| 2,332,181 | Soule | Oct. 19, 1943 |
| 2,335,808 | Soule | Nov. 30, 1943 |
| 2,409,862 | Hutchinson | Oct. 22, 1946 |
| 2,481,240 | Rapson et al. | Sept. 6, 1949 |
| 2,484,402 | Day et al. | Oct. 11, 1949 |

FOREIGN PATENTS

| Number | Country | Date |
|---|---|---|
| 575,173 | Great Britain | Feb. 6, 1946 |